United States Patent [19]
Ray et al.

[11] Patent Number: 5,466,935
[45] Date of Patent: Nov. 14, 1995

[54] PROGRAMMABLE, SCANNED-PROBE MICROSCOPE SYSTEM AND METHOD

[75] Inventors: David J. Ray, Agoura Hills; Robert S. Harp, Westlake Village, both of Calif.

[73] Assignee: Quesant Instrument Corporation, Agoura Hills, Calif.

[21] Appl. No.: 377,025

[22] Filed: Jan. 20, 1995

[51] Int. Cl.$^6$ ..................................................... H01J 37/28
[52] U.S. Cl. ............................. 250/307; 250/306; 73/105
[58] Field of Search ................................... 250/307, 306; 73/105

[56] References Cited

U.S. PATENT DOCUMENTS

| Re. 34,331 | 8/1993 | Elings et al. | 250/306 |
|---|---|---|---|
| Re. 34,489 | 12/1993 | Hansma et al. | 250/560 |
| 4,724,318 | 2/1988 | Binnig | 250/306 |
| 4,800,274 | 1/1989 | Hansma et al. | 250/306 |
| 5,025,658 | 6/1991 | Elings et al. | 73/105 |
| 5,066,858 | 11/1991 | Elings et al. | 250/307 |
| 5,260,572 | 11/1993 | Marshall | 250/306 |

FOREIGN PATENT DOCUMENTS

| 1-157049 | 6/1989 | Japan | 250/306 |
|---|---|---|---|

OTHER PUBLICATIONS

Kuk et al., Rev. Sci. Instrum. 60(2), Feb. 1989, pp. 165–180.
Marti, O., et al., "Atomic Force Microscopy of Liquid-Covered Surfaces", *Journal of Applied Physics Letters 51*, (7) Aug. 17, 1987, pp. 484–486.
Martin, Y., et al., "Atomic Force Microscope-Force Maping and Profiling", *Journal of Applied Physics 61*, (10), May 15, 1987, pp. 4723–4729.
Hanselmann, H., "Implementation of Digital Controllers", *Automatica*, vol. 23, No. 1, 1987.
Wickramasinghe, H. Kumar, "Scanned Probe Microscopes", *Scientific American*, Oct., 1989.

*Primary Examiner*—Jack I. Berman
*Attorney, Agent, or Firm*—Koppel & Jacobs

[57] ABSTRACT

Scanned-probe microscope systems (20, 140) are disclosed with analog control loops (24, 144) that can be electronically programmed to select from a plurality of transfer functions. The amplitude of the control loop reference signal (64) can also be electronically programmed. A controller (26) enables an operator to quickly program these operational characteristics. The controller preferably includes a visual display (33) and a recording device (32) to facilitate the programming and to display and store the scanning data obtained with the selected characteristics.

39 Claims, 3 Drawing Sheets

PROGRAMMABLE, SCANNED-PROBE MICROSCOPE SYSTEM AND METHOD

BACKGROUND OF THE INVENTION

1. Field of the Invention

The present invention relates generally to scanned-probe microscopes.

2. Description of the Related Art

The resolution of traditional optical microscopes that use lenses to focus radiation, e.g., visible light, is limited by diffraction to approximately ½ the radiation wavelength (a limit known as the "Abbe barrier" because of its description by Ersnt Abbe in the late 1800s). However, other imaging techniques are available to resolve details in the region below 250 nanometers, e.g., structures as small as single molecules, atomic scale crystal flaws, and microelectronic circuit patterns that have dimensions on the order of a few atoms.

Many of these techniques are complex and limited in their application. For example, an electron microscope typically includes an electron beam source, electron lenses, power supplies, and a vacuum chamber. Special sample preparation, e.g., metallization, is often required and the high-energy electrons may damage the sample. The art of X-ray diffraction typically requires an X-ray source, an X-ray collimator, a vacuum chamber and film exposure structures and is generally restricted to the investigation of atomic crystal lattices.

However, atomic scale topography of samples can be resolved by another, relatively simple, class of microscopes which are generally known as scanned-probe microscopes. These microscopes are characterized by a probe tip that is brought into close proximity with the surface of a sample to generate a measurable tip-to-surface interaction. In many scanned-probe microscopes, the proximity is so close that the electron clouds of the tip and sample atoms physically interface with each other.

For example, in a scanned tunneling microscope (STM), an electrical potential is imposed across the tip-sample gap. The potential causes tip and surface electrons to form a "tunneling current". This current is a measurable tip-to-surface interaction whose magnitude is extremely sensitive to the gap dimension. In an atomic force microscope (AFM), the force between the atoms of the tip and sample causes a deflection in a resilient cantilever that carries the tip; in this way the force becomes a measurable tip-to-surface interaction.

Sometimes the capillary action of a water film on the tip and/or sample can exert a tip-to-sample force that masks the atomic force. Accordingly, some scanned-probe microscopes immerse the tip-sample gap in a fluid, e.g., as described in U.S. Pat. No. Re. 34,489.

Other scanned-probe microscopes detect tip-to-surface interactions by vibrating the resilient cantilever near its resonant frequency (e.g., with a piezoelectric transducer). Any force that is exerted on the tip shifts the cantilever's resonant frequency; as a consequence, the vibration amplitude diminishes. The vibration amplitude then forms a measure of the tip-to-surface interaction.

The vibrating cantilever technique is particularly suited to microscopes in which the probe tip is spaced sufficiently from the sample to preclude the tunneling current effect and the electron cloud repulsion force but close enough to detect attractive forces. These include the surface tension of water that condenses between the tip and sample and the van der Walls interaction (relatively weak forces of attraction between atoms or molecules that are not bound to each other).

Scanned-probe microscopes can be used to measure sample properties other than their topography. The magnetic-force microscope (MFM) carries a magnetized nickel or iron probe on a vibrated resilient cantilever. The deflection amplitude can indicate the strength of magnetic field patterns, e.g., the pattern of a data-recording head. In an electrostatic-force microscope (EFM), a potential across the tip-sample gap has been used to map electrostatic forces, e.g., dopant patterns in semiconductors. A scanning thermal microscope has a tip that includes a thermocouple junction of two metals, e.g., tungsten and nickel. After this tip is heated, its heat loss varies with the tip-sample gap dimension. The voltage output from the thermocouple is a measurable tip-to-surface interaction. Further exemplary scanned-probe microscopes are described by Wickramasinghe (see Wickramasinghe, H. Kumar, "Scanned-Probe Microscopes", *Scientific American*, October, 1989).

Scanned-probe microscope systems are conventionally characterized by a feedback control circuit which compares an output signal that is related to the tip-to-surface interaction, with a predetermined reference to develop an error signal. The error signal is processed to form a control signal which is applied to a translation device, typically a piezoelectric transducer, that moves the tip and/or sample to control the tip-to-surface interaction. The sample surface is generally defined relative to an orthogonal x, y, z coordinate system. It is customary to align the x, y coordinates with the sample plane and define the tip-sample gap with the z coordinate.

U.S. Pat. No. Re. 34,331 is directed to a feedback control system for scanned-probe microscopes. As described in the Patent, "—the enhanced feedback—takes information from stored previous knowledge of the scan of the sample and specifically, information regarding the previous knowledge of the topography of the sample, and includes that information as part of the feedback control loop for the scan tip so that the tip can better follow the surface topography of the sample at each present location. Anticipating the topography thereby allows the system to provide a better following of the topography by not relying solely on the local error signal to adjust or change the height of the tip. The anticipation thereby uses the topographical information to increase the response of the feedback loop and also to provide for a more accurate rendering of the topography of the object under investigation by the scanning tunneling microscope." Digital and analog implementations are described. The digital implementation includes a feedback control in which the tunneling current is digitized by an A/D converter. The digitized tunneling current is then applied to a computer. The computer calculates what the vertical position of the tip should be and this calculation is supplied via a D/A converter to produce the proper vertical positioning signal, i.e., the control signal. The computer can also be used to accomplish integral, proportional and differential feedback.

The measurement scale of scanned-probe microscopes is extremely small. An exemplary x, y scan area may be 20×20 nanometers with a z-dimension movement on the order of 2 nanometers. Preparing and carrying out surface measurements in such a minute scale can be time consuming. Accordingly, U.S. Pat. No. Re. 34,489 is directed to setup and alignment problems of the sample and probe tip. In particular, positioning problems that involve the sample, the tip, a laser-emitting diode and a photoelectric sensor are addressed.

Adjusting and choosing a microscope system's operational characteristics for the investigation of a sample surface can also be a time-consuming effort. Analog control loops have features, e.g., excellent performance, simplicity and relatively low cost, that make them particularly suited for use in scanned-probe microscope systems. However, the topographical data of a surface is quite sensitive to the analog loop characteristics and considerable time is typically spent in adjusting these characteristics until acceptable quality of topographical data is obtained.

SUMMARY OF THE INVENTION

The present invention is directed to scanned-probe microscope methods and systems that are configured to facilitate the selection of analog system characteristics which enhance the quality of scanning data. It involves a recognition that electronic programming of analog system characteristics combined with display means for ready observation of scanning data will permit a rapid selection of a preferred set of characteristics. A reduction in the time required to gather scanning data is achieved with a consequent productivity increase.

A control loop is electronically programmed to choose any one of a plurality of selectable analog transfer functions, and an error signal is processed with the programmed control loop to obtain a microscope control signal that is a continuous function of the error signal. To decrease the time required to obtain a preferred set of system characteristics, the control signal is preferably displayed to observe the quality of the scanning data.

A system embodiment includes a control loop that is configured to provide an analog transfer function of $K_d s + K_p + K_i/s$ in which $K_d$, $K_p$ and $K_i$ are electronically selectable variables which are realized with programmable gain elements (s is the Laplace transform operator).

The novel features of the invention are set forth with particularity in the appended claims. The invention will be best understood from the following description when read in conjunction with the accompanying drawings.

DESCRIPTION OF THE PREFERRED EMBODIMENTS

Figure 1:
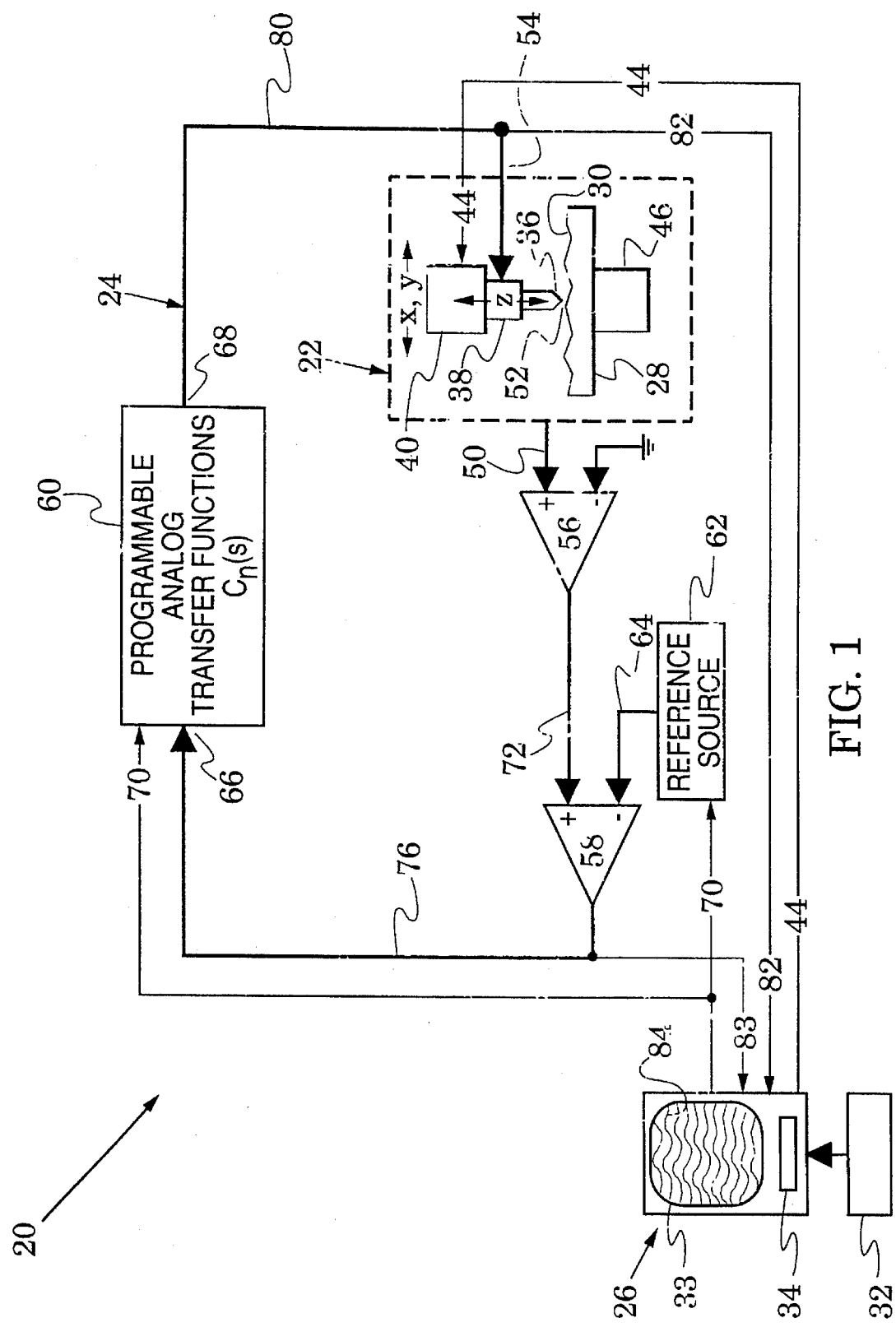
FIG. 1 is a block diagram of a scanned-probe microscope system in accordance with the present invention.

FIG. 1 illustrates a programmable, scanned-probe microscope system 20 in accordance with the present invention. The system 20 includes a scanned-probe microscope 22 and a programmable, analog control loop 24. The system 20 also includes a controller 26 from which the operational characteristics of the system 20 can be programmed. After a particular set of characteristic values has been selected and programmed, a scan of a sample 28 can be initiated and conducted from the controller 26 to investigate a parameter of the sample surface 30.

The controller 26 includes an input device 32, e.g., an electronic control panel, a keyboard and/or a mouse, to facilitate the input of the characteristic values by a system operator. The controller also preferably includes a visual display 33 and a storage/recording device 34, e.g., a magnetic tape or disc, on which the parameter data that is obtained during the scan can be displayed and/or stored. To facilitate future scans, the programmed characteristic values that were selected for the scan can also be stored with the scanning data.

Although the teachings of the invention may be practiced with any scanned-probe microscope, it is initially assumed for descriptive purposes that the scanned-probe microscope 22 is a STM. The STM 22 is schematically shown to have a probe whose tip 36 can be scanned over the sample surface 30. The probe tip 36 is carried by translation drivers in the form of piezoelectric transducers 38 and 40 to vary its spatial relationship with the sample surface. The transducer 40 moves the tip 36 in the x, y plane, which is substantially the plane of the sample surface 30. The transducer 38 moves the tip in the z direction, which is orthogonal to the x, y plane.

The controller 26 generates scanning signals 44 and transmits these scanning signals to the piezoelectric transducer 40 to move the probe tip 36 in the x, y plane. An exemplary scanned pattern is one that moves the probe tip in a raster pattern (a scan from side to side in lines from top to bottom). Although the probe tip 36 is commonly moved over the sample 28, the STM may also utilize a sample-carrying translation driver in the form of a piezoelectric transducer 46 for realizing some or all of the spatial movements between the tip 36 and the sample surface 30.

The STM 22 delivers an output signal which is a function of a tip-to-surface interaction. The output signal is typically a current 50 whose magnitude varies with the spacing of the gap 52 between the tip 36 and the sample surface 30. The tunneling current 50 flows in response to an electric potential that is imposed across the gap 52. The circuitry that generates this potential and other structural details of the STM 22 are not shown as they are well known in the art. The interaction, i.e., the tunneling current, is a function of a signal at the microscope control port 54. This signal is applied to the piezoelectric transducer 38 to change the spacing of the gap 52, and thereby, the magnitude of the tunneling current 50.

The feedback control loop 24 includes a preamplifier 56, a differential amplifier 58 and a compensator 60. A reference source 62 provides a reference signal 64 (sometimes referred to as a setpoint signal) to the negative input of the differential amplifier 58. The compensator 60 produces a plurality n of selectable analog transfer functions $C_n(s)$ between an input port 66 and an output port 68, i.e., the signal at the output port 68 is a continuous function of the signal at the input port 66 and the frequency characteristics (including the phase and magnitude) of the function are selectable. The controller 26 communicates over a programming data path 70 with the compensator 60 and the reference generator 62. Data transmitted over this path can program the compensator to select any one of the analog transfer functions $C_n(s)$ and can also selectively adjust the magnitude of the reference signal 64.

In the operation of the system 20, the preamplifier 50 converts the tunneling current 50 into an output voltage signal 72. The differential amplifier 58 compares this output signal 72 with the reference signal 64 to produce an error signal 76. The compensator 60 is programmed over the programming data path 70 by the controller 26 to have a selected transfer function $C_i(s)$. This transfer function is selected by a system operator via the input device 32.

After the transfer function $C_i(s)$ and a reference signal magnitude have been electronically programmed, the error signal 76 is processed by the compensator 60 to obtain a control signal 80, at the output port 68, which is a continuous function of the error signal 76. The control signal 80 is applied to the piezoelectric transducer 38 via the control port 54. In response, the transducer 38 moves the tip 36 so that the tip-to-surface spacing 52 produces an output voltage 72 which approaches the reference signal 64.

If the gain of the control loop 24 is sufficiently high, the action of the loop forces the error signal 76 to decrease to the point that the output voltage 72 and the reference signal 76 can be considered to be substantially equal. The control signal 80 is then a measure of the topography of the sample surface 30. The control voltage 80 can be sent over a control data path 82 to the controller 26 and plotted on the display 33 as a function of the scanning signal 44. As shown in FIG. 1, this causes a topographic map 84 of the surface 30 to be formed on the display 33. Alternatively, the error signal 76 can be sent over a data path 83 and used in place of the control signal in forming the map 84.

The quality of the topographic data is extremely sensitive to the selected electrical operational characteristics of the system 20, i.e., the transfer function $C_i(s)$ and the magnitude of the reference signal 64. In addition, these characteristics typically have to be selectively matched to each sample type and to mechanical system variables, e.g., mass loading, to enhance the quality of the topographic data.

In operating the system 20, an operator can observe on the display 33 the quality of data that is being gathered. Through the input device 32, the operator can select other combinations of transfer functions and reference signal magnitudes and observe the data quality obtained with each respective combination. Typically, a few lines of gathered and displayed data is sufficient to allow the operator to judge its quality. The programming arrangement of the system 20 permits an operator to observe the results of various characteristic values quickly, make a final selection and then gather a complete topographic map. If the selected characteristic values are stored with the gathered data, an operator has the option of using these selected values when the surface of that sample, or a similar one, is investigated at a future time.

The operational methods of the system 20 can be practiced with any scanned-probe microscope in which an output signal is a function of a tip-to-surface interaction and the interaction is a function of a signal at the microscope control port 54. FIGS. 2A–2D illustrate exemplary scanned-probe microscopes that have this structure.

Figure 2A:
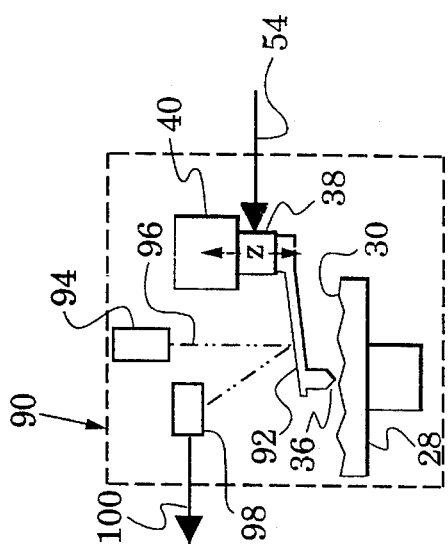
FIGS. 2A–2D are diagrams of exemplary scanned-probe microscopes that are suitable for use in the system of FIG. 1.
Figure 2B:
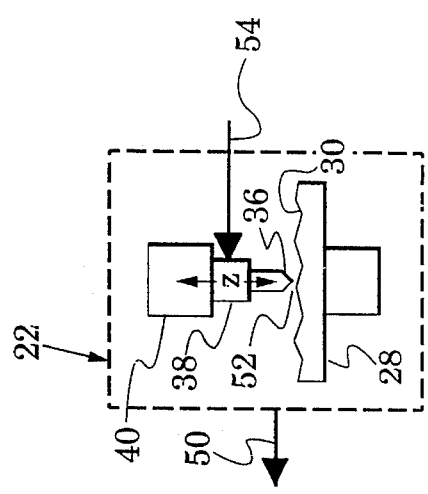

FIG. 2A is a schematic diagram of the STM 22 of FIG. 1. FIG. 2B is a schematic diagram of an AFM 90. The AFM 90 has similarities to the STM 22, with like elements indicated by like reference numbers. However, the tip 36 is carried by a resilient cantilever 92. A laser 94 emits a laser beam 96 which is reflected from the cantilever 92 and received by a detector 98, e.g., a pair of spaced photoelectric diodes in the form of a bicell. The output signal 100 of the detector 98 measures the deflection of the cantilever 92. This output signal is therefore a function of the force between the tip 36 and the surface 30. The repulsion force, in turn, is a function of a control signal at the control port 54 that affects movement in the direction z via the piezoelectric transducer 38.

Figure 2C:
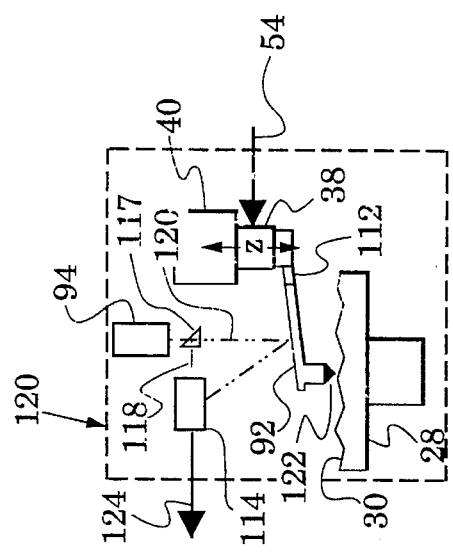

FIG. 2C is a schematic diagram of another scanned-probe microscope 110. The microscope 110 has similarities to the AFM 90, with like elements indicated by like reference numbers. However, the cantilever 92 is vibrated near or at its resonance by a driver in the form of a piezoelectric transducer 112. The resonance of the cantilever 92 is sensitive to forces between the tip 36 and the surface 30, e.g., the surface tension of a water film or the van der Walls interaction. When forces cause a change in the resonance frequency, a detectable change in vibration amplitude is the result.

This amplitude can be measured with a detector 114 that combines photodetectors with an amplitude detector to produce an output signal 116 that is a function of the attractive forces. A variation of the laser structure of FIG. 2B is illustrated in the microscope 110. The laser beam is split by a prism 117 into a reference beam 118 and an interrogation beam 120. The beams are recombined in the detector 114 and the movement of the cantilever 92 measured by well known interferometer methods. The force between the tip 36 and the surface 30 is a function of a control signal at the control port 54 that effects movement z via the piezoelectric transducer 38.

Figure 2D:
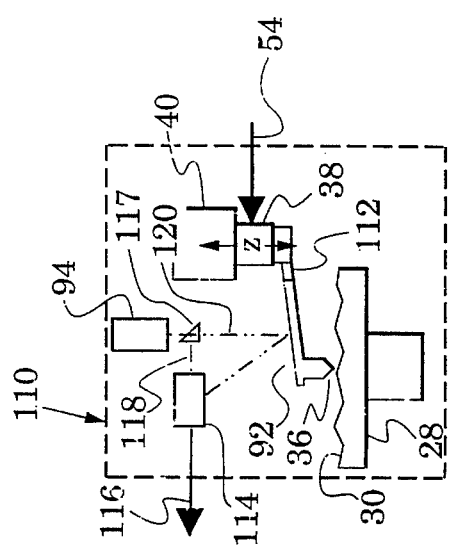

FIG. 2D is a schematic diagram of a magnetic-force microscope 120. The MFM 120 has similarities to the microscope 110, with like elements indicated by like reference numbers. However, the probe tip 122 is formed of a material that is sensitive to magnetic fields, e.g., magnetized nickel or iron. When the vibrating tip 122 is brought near magnetic fields, it experiences a force that changes the vibration amplitude to produce a corresponding output signal 124. The magnetic force between the tip 36 and the surface 30 is a function of a control signal at the control port 54. The MFM 120 can be converted into an electrostatic-force microscope by replacing the magnetic tip 122 with a tip that carries an electric potential.

Figure 3:
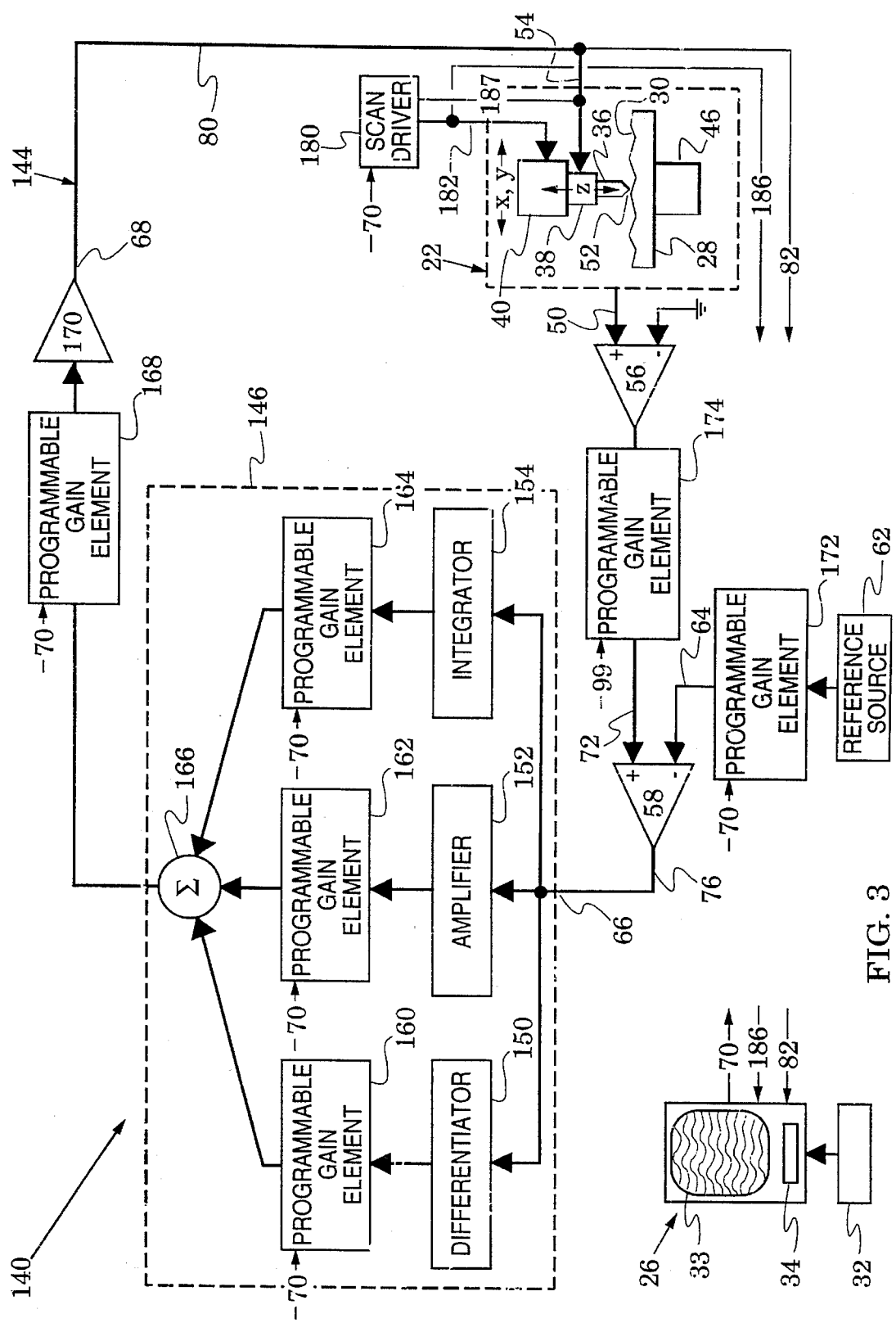
FIG. 3 is a block diagram of another embodiment of the system of FIG. 1.

FIG. 3 illustrates another scanned-probe microscope system embodiment 140. The system 140 is similar to the system 20 of FIG. 1, with like elements indicated by like reference numbers. However, the system 140 has a control loop 144 that incorporates a compensator 146. The selectable transfer functions of the compensator 146 belong to the compensation family that is generally referred to as proportional-plus-integral-plus-derivative (PID) compensation.

In particular, the compensator 146 includes a differentiator 150 that has a transfer function $K_d s$, a proportional amplifier 152 that has a transfer function $K_p$ and an integrator 154 that has a transfer function $K_i/s$. These elements are respectively arranged in series with programmable gain elements 160, 162 and 164 whose outputs are added in a summing device 166, e.g., a buffer amplifier. Therefore, the compensator 146 has a transfer function $G_c(s)=K_d s+K_p+K_i/s=(K_d s^2+K_p+K_i)/s$ in which $K_d$, $K_p$ and $K_i$ can be electronically programmed.

To add flexibility in programming the selectable analog transfer function of the control loop 144 between its input port 66 and its output port 68, the loop further includes a programmable gain element 168 and an output amplifier 170. Preferably, the programmable frequency response of the PID compensator 146 sets the frequency response of the control loop 144, i.e., the frequency response of the other loop elements is constant over a far greater frequency band than that of the compensator 146. If the total gain of the other elements 168, 170 is represented by $K_t$, the control loop 144 has a transfer function of $K_t\{(K_d s^2+K_p+K_i)/s\}$.

This transfer function allows the closed-loop characteristics of the system 140 to be selectively varied to obtain at least the following system adjustments: 1) improved transient response as a result of greater loop gain at higher frequencies, i.e, greater system bandwidth, 2) reduced overshoot as a result of increased system phase margin, 3) reduced steady-state error as a result of increased loop gain at selected frequencies and 4) increased stability as a result of increased phase and gain margins.

The system 140 also includes programmable gain elements 172 and 174 which permit flexibility in selecting the automatically controlled spacing of the tip-to-surface gap 52. In contrast with the system 20, the system 140 has a dedicated scan driver 180 which develops scanning signals 182 that are programmed from the controller 26 along the programming data path 70. The scanning signals 182 that are applied to the piezoelectric transducer 40 are communicated to the controller 26 along a scanning data path 186. The programmable gain elements 160, 162, 164, 168, 172 and 174 are all programmed by the controller 26 over the programming data path 70.

In a practical scanned-probe microscope, the spacing of the tip-to-surface gap 52 is reduced to an appropriate, predetermined loop-capture range prior to application of the control voltage 80, i.e., prior to closing the control loop 144. Accordingly, the scan driver 180 also produces a z-translation analog drive signal 187 which is applied to the piezoelectric transducer 38. In operation, an open-loop positioning signal, e.g., a digital signal, is calculated by the controller 26 and transmitted to the scan driver 180. In response, the scan driver 180 converts this command to an analog drive signal 187 causes an open-loop movement of the transducer 38 that brings the tip within the loop-capture range. Subsequently, the control signal 80 is applied for closed-loop operation. In other embodiments, the scan driver 180 can be incorporated as part of the controller 26.

Exemplary realizations of the programmed gain elements include programmable attenuators and multiplying digital-to-analog converters. The output of a multiplying digital-to-analog converter is the product of a digital code multiplied by an analog input reference signal, i.e., the analog reference signal is scaled by the digital code. An example of a suitable multiplying digital-to-analog converter is the MP7545B CMOS converter manufactured by Micro Power Systems of Santa Clara, Calif. This converter multiplies an input analog signal in response to a 12-bit digital word. Accordingly, in a system embodiment that uses this converter the programming data path 70 would include a 12-bit parallel data bus.

In embodiments of the invention, the controller 26 of FIGS. 1 and 3 can be effectively realized as a digital computer although custom designed control panels may also be employed. In either case, the controller 26 responds to the system characteristic selections of an operator and digitally calculates the appropriate programming data which it then transmits over data paths to other system elements e.g., the compensator 146 and the programmable gain element 172. The controller 26 may also convert the scan and control data that it receives on the data paths 82 and 186 to a digital format which it then displays and/or stores on the display 33 and the storage device 32.

Figure 4:
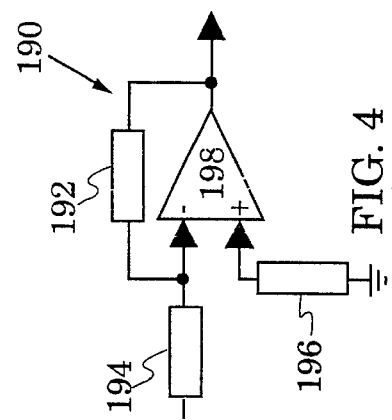
FIG. 4 is a block diagram of an exemplary compensation circuit for use in the systems of FIGS. 1 and 3.

Other realizations of the compensator 146 and/or its component parts can be made with well known operational amplifier circuits. For example, FIG. 4 illustrates a simplified operational amplifier circuit 190 with a feedback component 192 and input components 194 and 196 arranged around an operational amplifier 198. The amplifier 190 can be adapted to realize various compensator functions, e.g., differentiators and integrators, that are compatible with the present invention by using programmable gain elements, e.g., programmable resistors, and/or programmable reactance elements, e.g., programmable capacitors or inductors, for selected ones of the feedback and input components 192, 194 and 196. For example, a programmable integrator is formed if component 194 is a resistor and component 192 is a series combination of a capacitor and a programmable gain element.

Methods and apparatus in accordance with the present invention combine the advantages of analog control loops, e.g., simplicity and low-cost, with the flexibility and speed of electronic programming. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of controlling a tip-to-surface interaction between a sample surface and a probe tip of a scanned-probe microscope wherein said microscope has an output signal that is a function of said interaction and said interaction is a function of a signal at a microscope control port, the method comprising the steps of:

comparing said output signal with a predetermined reference signal to obtain an error signal;

electronically programming a control loop to choose any one of a plurality of selectable analog transfer functions;

processing said error signal with said programmed analog control loop to obtain an analog control signal; and applying said control signal to said microscope control port.

2. The method of claim 1, wherein said electronic programming step includes the step of transmitting programming data to said control loop.

3. The method of claim 2, wherein said electronic programming step further includes the step of digitally calculating said programming data.

4. The method of claim 1, wherein said electronic programming step includes the step of electronically changing the internal circuitry state of said control loop to cause it to have any one of a plurality of selectable gain versus frequency responses.

5. The method of claim 1, wherein said electronic programming step includes the step of electronically changing the internal circuitry state of said control loop to cause it to have any one of a plurality of selectable phase versus frequency responses.

6. The method of claim 1, further including the step of transmitting data to a programmable reference generator to program the magnitude of said reference signal.

7. The method of claim 1, wherein said comparing step includes the step of transmitting data to a programmable gain element to change the magnitude of said output signal.

8. The method of claim 1, wherein said applying step is preceded by the step of moving said probe tip into a predetermined loop-capture range relative to said sample surface.

9. The method of claim 8, wherein said moving step includes the steps of:

calculating a digital command that corresponds with a movement of said probe tip into said loop-capture range; and converting said digital command to an analog input signal for application to a translation device that carries said probe tip.

10. The method of claim 8, further including the step of generating an open-loop positioning signal and wherein said moving step is in response to said open-loop positioning signal.

11. A method of investigating a sample surface with the probe tip of a scanned-probe microscope wherein said microscope has an output signal that is a function of a tip-to-surface interaction and said interaction is a function of a signal at a microscope control port, the method comprising the steps of:

comparing said output signal with a predetermined reference signal to obtain an error signal;

electronically programming a control loop to choose any one of a plurality of selectable analog transfer functions;

processing said error signal with said programmed control loop to obtain an analog control signal;

applying said control signal to said microscope control port; and scanning said probe tip along said sample surface.

12. The method of claim 11, further including the step of displaying said control signal as a function of said scanning step.

13. The method of claim 12, wherein said displaying step includes the step of sending digitized scan and control data to a visual display.

14. The method of claim 11, further including the step of displaying said error signal as a function of said scanning step.

15. The method of claim 11, further including the step of recording said control signal as a function of said scanning step.

16. The method of claim 15, wherein said recording step includes the step of sending digitized scan and control data to a recording device.

17. The method of claim 11, wherein said electronic programming step includes the step of transmitting programming data to said control loop.

18. The method of claim 17, wherein said electronic programming step further includes the step of digitally calculating said programming data.

19. The method of claim 17, wherein said electronic programming step includes the step of electronically changing the internal circuitry state of said control loop to cause it to have any one of a plurality of selectable gain versus frequency responses.

20. The method of claim 11, wherein said electronic programming step includes the step of electronically changing the internal circuitry state of said control loop to cause it to have any one of a plurality of selectable phase versus frequency responses.

21. The method of claim 11, further including the step of transmitting data to a programmable reference generator to program the magnitude of said reference signal.

22. The method of claim 11, wherein said comparing step includes the step of transmitting data to a programmable gain element to change the magnitude of said output signal.

23. A programmable, scanned-probe microscope system for investigating the surface of a sample, comprising:

a scanned-probe microscope having a probe tip whose spatial relationship with said sample surface is a function of a signal at a microscope control port, said microscope configured to provide an output signal that is a function of a tip-to-surface interaction;

a comparator that produces an error signal in response to the difference between said output signal and a predetermined reference signal;

a control loop configured to provide a plurality of selectable analog transfer functions between a loop input port and a loop output port, and to select one of said analog transfer functions in response to programming data received at a data input port, said control loop arranged to receive said error signal at said input port and with said output port coupled to said microscope control port, said control port thereby receiving a control signal that is a continuous function of said error signal; and a controller configured to generate and transmit said programming data to said data input port.

24. The microscope system of claim 23, wherein said analog transfer functions can be represented as a transfer function expression of one or more variables and said control loop includes a programmable gain element that is arranged to change the value of one of said variables in response to said programming data.

25. The microscope system of claim 24, wherein said programmable gain element comprises a multiplying digital-to-analog converter having an analog output signal whose magnitude is responsive to said programming data.

26. The microscope system of claim 24, wherein said transfer function expression is $K_d s + K_p + K_i/s$ in which $K_d$, $K_p$ and $K_i$ are said variables and s is the Laplace transform operator.

27. The microscope system of claim 23, wherein said controller comprises a digital computer.

28. The microscope system of claim 23, wherein said analog transfer functions can be represented as a transfer function expression of one or more variables and said control loop includes a programmable reactance element that is arranged to change the value of one of said variables in response to said programming data.

29. The microscope system of claim 23, wherein:

said spatial relationship between said probe tip and said sample surface is also a function of scanning signals at a microscope scanning port; and said controller is configured to generate said scanning signals and transmit them to said scanning port.

30. The microscope system of claim 29, wherein said controller is configured to receive said control signal and said controller includes a display configured to display said control signal as a function of said scanning signals.

31. The microscope system of claim 29, wherein said controller is configured to receive said error-signal and said controller includes a display configured to display said error signal as a function of said scanning signals.

32. The microscope system of claim 29 wherein said controller is configured to receive said control signal and said controller includes a storage device configured to store said control signal as a function of said scanning signals.

33. The microscope system of claim 23, further including a reference generator configured to generate said reference signal with a plurality of selectable magnitudes of which any one is selectable by a programming signal, and wherein said controller is configured to generate and transmit said programming signal to said reference generator.

34. The microscope system of claim 23 wherein;

said microsope is configured to respond to an open-loop signal at its control port by bringing said spatial relationship between said probe tip and said sample surface into a predetermined loop-capture range; and said controller is configured to transmit said open-loop signal to said microscope control port.

35. The method of claim 23, wherein said tip-to-surface interaction is a tunneling current between said probe tip and said surface.

36. The method of claim 23, wherein said tip-to-surface interaction is an atomic repulsion force between said probe tip and said surface.

37. The method of claim 23, wherein said tip-to-surface interaction is an atomic attraction force between said probe tip and said surface.

38. The method of claim 23, wherein said tip-to-surface interaction is a magnetic force between said probe tip and said surface.

39. The method of claim 23, wherein said tip-to-surface interaction is an electrostatic force between said probe tip and said surface.

* * * * *